(12) United States Patent
Olenz et al.

(10) Patent No.: US 8,861,366 B1
(45) Date of Patent: Oct. 14, 2014

(54) MULTI-LEVEL FLOW CONTROL

(75) Inventors: Randy Michael Olenz, Naperville, IL (US); Joseph V. Slogar, Jr., Somonauk, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 82 days.

(21) Appl. No.: 13/164,798

(22) Filed: Jun. 21, 2011

Related U.S. Application Data

(60) Provisional application No. 61/356,761, filed on Jun. 21, 2010.

(51) Int. Cl.
*G06F 11/00* (2006.01)
*H04L 1/00* (2006.01)

(52) U.S. Cl.
USPC .......................................... 370/237; 370/236

(58) Field of Classification Search
USPC ................................................. 370/236, 237
See application file for complete search history.

(56) References Cited

U.S. PATENT DOCUMENTS

| | | | |
|---|---|---|---|
| 6,170,022 B1 * | 1/2001 | Linville et al. | 710/29 |
| 6,724,725 B1 * | 4/2004 | Dreyer et al. | 370/231 |
| 6,980,520 B1 * | 12/2005 | Erimli | 370/236 |
| 7,564,785 B2 * | 7/2009 | Krishnamurthi et al. | 370/230 |
| 7,961,606 B2 * | 6/2011 | Cunningham | 370/229 |
| 2003/0156542 A1 * | 8/2003 | Connor | 370/236 |
| 2005/0174941 A1 * | 8/2005 | Shanley et al. | 370/235 |
| 2007/0171914 A1 * | 7/2007 | Kadambi et al. | 370/395.2 |

\* cited by examiner

*Primary Examiner* — Warner Wong
(74) *Attorney, Agent, or Firm* — Troy A. Van Aacken

(57) ABSTRACT

Various methods, systems, and apparatuses can be used to control flow in an ethernet environment. In some implementations, methods can include receiving a flow of ethernet frames at a first device via an ethernet switch, determining that a buffer at the first device exceeds a threshold for an incoming flow, generating an initial pause frame operable to pause only a second device, and transmitting the initial pause frame to the ethernet switch.

17 Claims, 3 Drawing Sheets

| 7B | 1B | 6B | 6B | 2B | 2B | 2B | 42B | 4B |
|---|---|---|---|---|---|---|---|---|
| PREAMBLE | START DELIM | DMAC | SMAC | LEN/TYP | MAC CTRL OP | QUANTA | PAD | CRC |
| - | - | 180C2000001 | - | 0x8808 | 0x0001 | 0-65K | 0 | - |

{ 64B PAUSE FRAME }

FIG. 2

| 7B | 1B | 6B | 6B | 2B | 2B | 2B | 42B | 4B |
|---|---|---|---|---|---|---|---|---|
| PREAMBLE | START DELIM | DMAC | SMAC | LEN/TYP | MAC CTRL OP | QUANTA | PAD | CRC |
| - | - | IC_C MAC | IC_D MAC | 0xABCD | 0x0001 | 0-65K | 0 | - |

{ 64B CUSTOM PAUSE FRAME }

FIG. 3

MULTI-LEVEL FLOW CONTROL

TECHNICAL FIELD

This disclosure relates to improving program acquisitions in internet protocol-based television (IPTV).

BACKGROUND

In today's world more and more applications are using ethernet for connectivity. Not only to interconnect systems on a large scale, but to also interconnect integrated circuits (ICs) on a small scale. Using ethernet to connect ICs, though, typically involves using a switch. However, most layer-2 type switches have simple or limited buffer management or flow control. Moreover, the ICs themselves typically are not suited for consuming bursty traffic and can overflow their buffers using simple layer-2 switching.

BRIEF DESCRIPTION OF THE DRAWINGS

FIG. 2 is a block diagram illustrating an example pause frame.
FIG. 3 is a block diagram illustrating an example custom pause frame.

DETAILED DESCRIPTION

Disclosed herein are example implementations and methods for flow control and avoiding blocking issues using a layer 2 (L2) ethernet switch in an interconnected system. Also disclosed herein are examples using the L2 ethernet switch that include multiple ICs on a single circuit pack, but the implementations and methods can be extended to a medium sized system made up of several circuit packs, for example.

Figure 1:
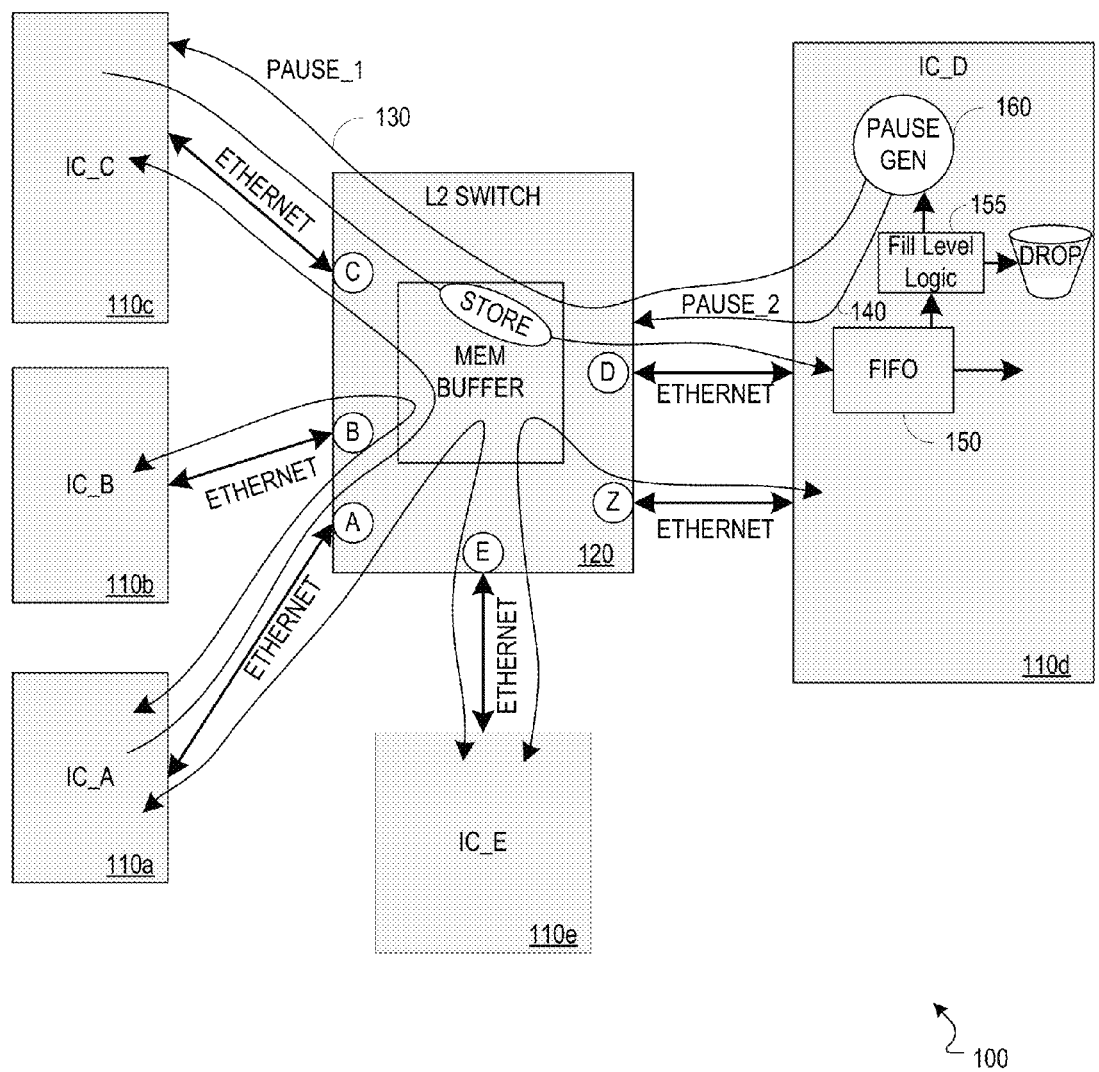
FIG. 1 is a block diagram illustrating an example system operable to provide multi-level flow control.

FIG. 1 is a block diagram illustrating an example system 100 operable to provide multi-level flow control. FIG. 1 is an example of a small interconnected system of ICs 110a-e, all communicating via ethernet. Any ethernet rate (10 Mbps, 100 Mbps, 1 Gbps, etc.) can be used, and traffic passing from one L2 switch port to another can be transmitted at the same rate.

In some implementations, the center IC chip can be an L2 switch chip 120. The L2 switch chip 120 can be managed or unmanaged and can include any number of ports A-E, Z. The system 100 of this example shows six ports labeled A through E and Z, connected to five ICs 110a-e, with IC_D 110d including two ports D, Z. Lines with arrows show sample data flows through the L2 Switch 120. In this example, these flows are between:

IC_A and IC_E, Bidirectional
IC_A and IC_B, Bidirectional
IC_A and IC_C, Unidirectional
IC_C and IC_D, Unidirectional
IC_E and IC_D, Bidirectional Any number of Unidirectional and Bidirectional data flows through the L2 switch 120 can be supported. Thus it should be understood that the example depicted is intended to be non-limiting. The unidirectional flow coming into L2 switch 120 port C and going out of port D (labeled in FIG. 1 with the word "store") can be used as an example flow problem, which can be addressed by example implementations of the multi-level flow control disclosed.

Many L2 switches 120 can operate to connect multiple ICs 110a-e together on a board as shown in example FIG. 1. However, as mentioned above, L2 switches 120 typically have very simple or limited buffer management and flow control. Most such switches can support the 802.3x PAUSE ethernet flow control feature, such as the "pause" frame shown in FIG. 2.

Referring back to FIG. 1, an example case can be described in which a data flow may need to be PAUSED. For example, IC_C 110c might be processing a large data flow of packets it receives from IC_A 110a. The flow is then passed on to IC_D 110d via the unidirectional flow labeled "store." IC_C 110c might be the processing engine and has a large amount of storage for packets, and bursts some number of packets out as they are ready. In this example, IC_D 110d can keep up with the average packet rate coming from IC_C 110c, but IC_D 110d might include limited storage resources. Thus, IC_D 110d might not always consume the full bursts coming out of IC_C 110c.

In one example, to prevent overflowing its buffers and dropping packets, IC_D 110d can occasionally pause the data flow from IC_C 110c. IC_D 110d usually pauses the data flow by sending a PAUSE frame to the L2 switch 120. Such an ethernet PAUSE frame is a well known specifically defined frame as shown in FIG. 2.

The PAUSE frame can typically include the standard ethernet preamble and start of frame delimiter, followed by a special multicast DMAC (Destination media access control (MAC)) address. Even though this is a multicast address it is reserved to identify 802.3x PAUSE frames and will be terminated and not passed on by the receiving device. The next portion of the PAUSE frame is the 6 Byte SMAC field containing the MAC of the sender, which is, in turn, followed by a special length/type field, with a value of 0x8808. The 0x8808 value of the length/type field defines this packet as a multi point control protocol type used for PAUSE frames. Following the special length/type field is the MAC control opcode field, the value of which is currently defined as 0x0001 for PAUSE. The 2 byte quanta field is used by the receiving IC 110a-e to determine a duration during which to stop sending frames. One unit here is equal to 512 bit times on the link. The remainder of the packet is then padded with 42 bytes of zeros and a valid cyclic redundancy check (CRC) value is placed on the end. In some implementations, typical PAUSE frames can be 64 Bytes long.

Referring back to FIG. 1, if the L2 switch 120 supports 802.3x PAUSE, as most do, the L2 switch 120 can quickly stop sending data out port D to allow IC_D 110d to "catch up." However, while PAUSED, the L2 switch 120 will continue to receive a large amount of data from IC_C 110c on port C, quickly filling its small internal buffers (MEM Buffer in FIG. 1). As a result, the L2 switch 120 might send PAUSE frames out all of its ports to stop all ICs 110a-e connected to it.

More expensive L2 switches 120 can make better decisions in this case and can control the flow from IC_C 110c through offending port C (e.g., based on QoS or priority schemes). However, low cost switches are not this sophisticated.

By transmitting PAUSE frames from all ports, all traffic might stop for some period of time. However, such a situation might be unacceptable because other traffic such as IC_A 110a to IC_C 110c and IC_E 110e to IC_D 110d might be critical and should not be stopped at any time. Further, some of these connected ICs 110a-e may not even support the PAUSE protocol.

Because IC_C 110c can be identified as the source of the overload when IC_D 110d intends to PAUSE the flow, overload can be alleviated or eliminated if IC_D 110*d* paused only IC_C 110*c*. However, there are some issues with pausing only IC_C 110*c*. First a typical PAUSE frame cannot be passed through the L2 switch 120 directly to PAUSE IC_C 110*c*— the typical PAUSE frame is always consumed, and in our example, it will not be passed beyond the L2 switch 120. Secondly, trying to address a PAUSE frame to IC_C 110*c* (using its MAC address as the destination) will also not pass though L2 switch 120, because the L2 switch 120 blocks PAUSE frames having a value of 0x8808 in the Type field.

To address the overload, the disclosure below describes example implementations of a custom PAUSE frame that IC_D 110*d* can send though the L2 switch 120, and example methods for processing such a custom PAUSE frame type inside IC_C 110*c*.

FIG. 3 below shows an example makeup of a custom PAUSE frame. The custom PAUSE frame can have the standard ethernet preamble and start of frame delimiter as that of a non-custom PAUSE frame. In the example of FIG. 1, the custom PAUSE frame will be directed at IC_C 110*c*, which is the offending IC that contributes substantially to the overflow. The value of the DMAC field is the MAC of IC_C. This addresses the unicast packet to IC_C 110*c*. Next is the 6 Byte SMAC field containing the MAC of the sender, which in this example case is IC_D 110*d*. The custom PAUSE frame can also be unicast addressed to the offending IC, and in the example of FIG. 1, it can have a DMAC equal to IC_C's MAC. In example implementations, the type field may be as shown in FIG. 3—0xABCD. The type field can be any value such that the receiving IC (in this case the L2 switch 120) will allow it to pass to the offending IC (in this case, IC_C 110*c*), and it can also be one that is not normally used (or very infrequently used) for performance of another operation by the network or devices in the network. Thus, the actual value can be defined per system, and can be unique and passed by the L2 switch 120.

However, the possibility also exists that the type field can also be interpreted as a length field depending on its value. To be interpreted as a type field it should include a value greater than 1500 or 0x05DC. Following this is the standard MAC control opcode field which is always 0x0001 for PAUSE. The 2 Byte quanta field tells the receiving IC 110*c* how long to stop sending frames. The packet is also filled with 42 bytes of zeros and a CRC is placed on the end. The custom PAUSE frames can be 64 bytes long. Thus, the custom frame is very similar to the standard or typical PAUSE frame, making it relatively simple to implement its use into existing logic in IC_C 110*c*.

Referring back to FIG. 1, Pause_1 frame 130 represents the custom PAUSE frame sent by IC_D 110*d* through the L2 switch 120 to IC_C 110*c*. Pause_2 frame 140 represents a standard PAUSE frame sent from IC_D 110*d* to the L2 switch 120. In operation, IC_D 110*d* includes fill level logic 155 that is operable to monitor its input buffer 150 fill level. When a certain threshold is reached or exceeded, the fill level logic 155 can instruct a pause generator 160 to send a Pause_1 frame 130 to IC_C 110*c* to stop traffic. In response to the Pause_1 frame 130, IC_C 110*c* stops sending packets to port C of the L2 switch 120. If the L2 switch 120 has buffered any frames destined for IC_D 110*d*, they can drain out of the L2 switch 120 to IC_D 110*d*.

The fill level logic 155 continues to monitor its buffer 150 fill level. If the fill level is still growing due to packets stored in the L2 switch 120 draining, the fill level logic 155 can assert a Pause_2 frame 140 to quickly stop the flow out of port D of the L2 switch 120. Since the flow coming in to port C of the L2 switch 120 has already been stopped, the L2 switch 120 will not fill any of its buffers and other traffic can continue to flow unblocked.

It should be understood that the Pause_1 frame 130 and Pause_2 frame 140 can be used in different ways to control traffic flow. The differences can include differences in how a data flow is restarted. The IC_C 110*c* can be stopped first, then the L2 Switch 120 can be stopped. Then, the L2 Switch 120 can be restarted first, and the IC_C 110*c* flow can be restarted.

Furthermore, the PAUSE protocol quanta value can be used to indicate how long to pause for. A non-zero quanta value can cause the receiving end to stop sending packets for that value times 512 bit time periods (e.g., based on the link rate). Any value can be sent, and the receiver, IC_C 110*c* in this example, can count down based on that value, timeout, and start sending again. In other implementations, a value of 0 quanta can be used to instruct the receiving device to immediately start sending again. For this multi-level flow control setup, the quanta settings can be full value (e.g., 65535) for Pause_1 frame 130 and something less than that for Pause_2 frame 140 (e.g., 32000). Pause_1 frame 130 can be sent first with a long timeout, and if Pause_2 frame 140 is needed, it can be sent with a shorter timeout. In both cases the timeouts can be very long and easily allow the buffer 150 in IC_D 110*d* time to drain. In order to restart transmission, a Pause_2 frame 140 with quanta 0 can be sent first, followed immediately by a Pause_1 frame 130 with Quanta 0.

One or more IC chips can be programmed to perform the above described operations. In such implementations, IC_C 110*c* and IC_D 110*d* can include programmable and/or configurable ethernet interfaces. Examples of such ICs can include custom ASICs, FPGAs, or Network processors. In the example of FIG. 1, IC_C 110*c* can be programmed or operable to respond to the custom PAUSE frame, and IC_D 110*d* can monitor its input buffer levels and can send PAUSE frames as needed.

An IC chip 110*a-e*, for example the IC_D chip 110*d*, can be programmed to determine if its buffer fill level threshold has been met or exceeded, and can also be programmed to identify one or more ICs 110*a-c*, 110*e* as the source of the overload; in the example above, IC_C 110*c* was identified as the source. IC_D 110*d* can also be programmed to send out an example Pause_1 frame 130 to IC_C 110*c*. Further, IC_D 110*d* can be programmed to continue to monitor its buffer fill levels and if thresholds are continuing to be met or exceeded, and if so, to send out a typical Pause_2 frame 140. If other ICs are identified as the source of an overload, IC_D 110*d* can send out another Pause_1 frame 130 prior to sending out a Pause_2 frame. The additional Pause_1 frame 130 can be directed to the additional source of overload.

An IC chip 110*a-e*, can be programmed to process the data in the fields of the Pause_1 frame 130 and perform stop-start operations. It can be programmed, for example, to recognize that the Pause_1 130 request came from a particular chip such as the IC_D chip 110*d*, by the information contained in the SMAC field. If the Pause_1 frame 130 contains, for example 0xABCD, and the Mac Ctrl Op field also contains 0x0001 for PAUSE, then it can stop sending out data for the period specified in the quanta field, timeout, and then start sending data again. It can also be programmed to stop sending data only to the requesting device identified in the SMAC field (IC_D in the above example)—thus, if it has a one or more other ports through which it is sending data to another IC, it can continue to send that data through the other ports.

In other implementations, the IC_C chip 110*c* can be programmed to re-start the sending of data upon receiving a second Pause_1 frame 130 wherein the quanta field is, for example, 0. Thus, the IC_C chip 110c can re-start and continue to send data.

In other implementations, the IC_C chip 110c can be programmed only to stop sending data if the Pause_1 frame 130 was requested by a particular chip. Thus, in the example above, IC_C 110c can be programmed to pause only if, for example, the Pause_1 frame 130 came from IC_D 110d, and not if it came from IC_A 110a, IC_B 110b, or IC_E 110e.

Figure 4:
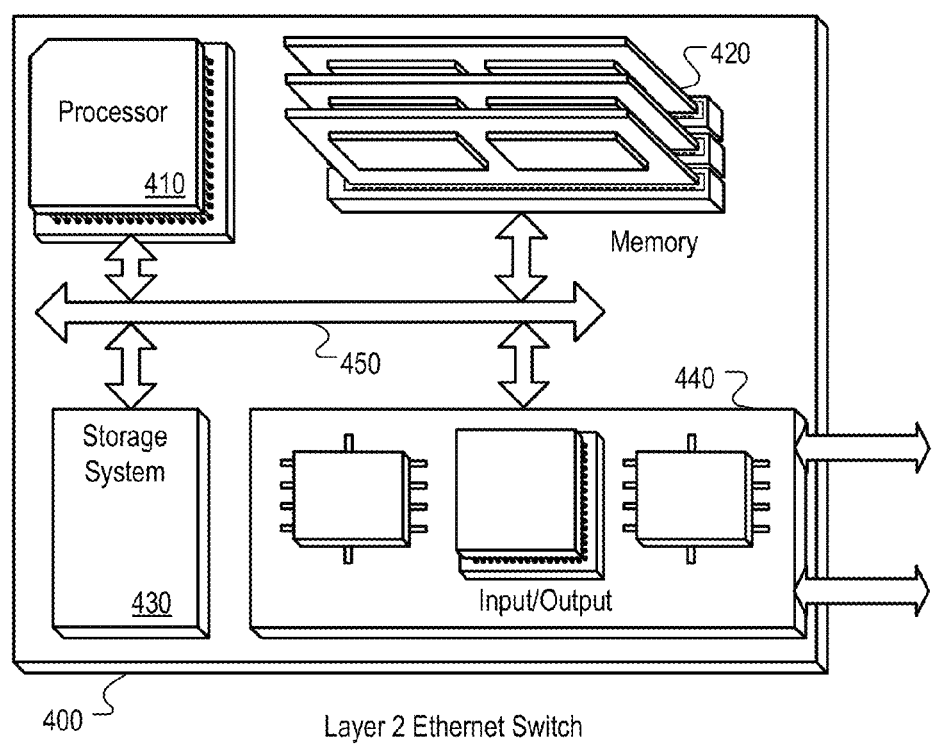
FIG. 4 is a component diagram of a layer 2 ethernet switch.
Like reference numbers and designations in the various drawings indicate like elements.

FIG. 4 is a component diagram of an example layer 2 ethernet switch. The layer 2 ethernet switch 400 can include a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 can operate to store information within the device 400. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the device 400. In one implementation, the storage device 430 is a computer-readable medium. In various different implementations, the storage device 430 can include, for example, a hard disk device, an optical disk device, flash memory or some other large capacity storage device.

The input/output device 440 provides input/output operations for the device 400. In one implementation, the input/output device 440 can interface to various integrated circuit chips (e.g., IC chips 110a-e of FIG. 1). In addition, such input/output device 440 can communicate with other external devices through various interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a content delivery network 860 and/or content source network 870), as well as sending communications to, and receiving communications from various networks (not shown).

The device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving a flow of ethernet frames at a first device via an ethernet switch;
   determining that a buffer at the first device exceeds a first threshold for an incoming flow;
   generating a first initiate pause frame operable to pause only a second device, the second device being the device that initiated the flow of ethernet frames that caused the buffer to exceed the first threshold, the first initiate pause frame comprising a substantially conventional pause frame but operating to pause the originating device at a link layer using a destination media access control address and length/type field within the first initiate pause frame that is operable to pass through intermediate switching and cause the second device to immediately stop sending data;
   transmitting the first initiate pause frame to the ethernet switch;
   continuing to receive ethernet frames associated with the flow from the ethernet switch based upon ethernet frames already received at the ethernet switch prior to the second device suspending transmission of the ethernet frames associated with the flow;
   continuing to monitor the buffer; and
   if the buffer exceeds a second threshold, transmitting a second initiate pause frame addressed directly to the ethernet switch.

2. The computer-implemented method of claim 1, wherein the ethernet switch is operable to forward the first initiate pause frame to the second device.

3. The computer-implemented method of claim 2, wherein the second device is operable to parse the first initiate pause frame and to suspend transmission of ethernet frames associated with the flow to the first device.

4. The computer-implemented method of claim 1, wherein the first initiate pause frame includes a field operable to identify a duration during which the transmission of ethernet frames associated with the flow should be suspended.

5. The computer-implemented method of claim 4, further comprising transmitting a first terminate pause frame identifying a duration of the pause to be zero, wherein receipt of the first terminate pause frame causes the second device to resume transmitting ethernet frames associated with the flow.

6. The computer-implemented method of claim 1, wherein the ethernet switch is operable to suspend transmission of ethernet frames associated with the flow to the first device responsive to receipt of the second initiate pause frame from the first device.

7. The computer-implemented method of claim 1, wherein the second initiate pause frame includes a duration during which the ethernet switch should suspend transmission of ethernet frames associated with the flow.

8. The computer-implemented method of claim 7, further comprising transmitting a second terminate pause frame identifying a duration of the pause to be zero, wherein receipt of the second terminate pause frame causes the ethernet switch to resume transmitting ethernet frames associated with the flow.

9. The computer-implemented method of claim 1, wherein the first and second devices and ethernet switch comprise integrated circuits integrated into a single apparatus, and being operable to communicate with each other using an ethernet protocol.

10. A system, comprising:
   a first integrated module operable to receive a flow of ethernet frames via an integrated ethernet switch;
   fill level logic operable to determine that a buffer at the first integrated module exceeds a first threshold for an incoming flow;
   a pause generator operable to generate a first initiate pause frame operable to pause only a second integrated module, the second integrated module being an initiator of the flow of ethernet frames that caused the buffer to exceed the first threshold, the first initiate pause frame comprising a substantially conventional pause frame but operating to pause the originating device at a link layer using a destination media access control address and length/type field within the first initiate pause frame that is operable to pass through intermediate switching and cause the second device to immediately stop sending data;

wherein the first integrate module is operable to cause the first initiate pause frame to be transmitted to the integrated ethernet switch;

wherein the buffer is operable to continue to receive ethernet frames associated with the flow from the integrated ethernet switch based upon ethernet frames already received at the integrated ethernet switch prior to the second integrated module suspending transmission of the ethernet frames associated with the flow;

wherein the fill level logic is operable to continue to monitor the buffer, and instruct the pause generator to generator a second initiate pause frame addressed directly to the integrated ethernet switch if the buffer exceeds a second threshold.

11. The system of claim 10, wherein the integrated ethernet switch is operable to forward the first initiate pause frame to the second integrated module.

12. The system of claim 11, wherein the second integrated module is operable to parse the first initiate pause frame and to suspend transmission of ethernet frames associated with the flow to the first integrated module.

13. The system of claim 10, wherein the first initiate pause frame includes a field operable to identify a duration during which the transmission of ethernet frames associated with the flow should be suspended.

14. The system of claim 13, wherein the pause generator is further operable to transmit a first terminate pause frame, the first terminate pause frame being identical to the first initiate pause frame except that it identifies a duration of the pause to be zero; wherein receipt of the first terminate pause frame causes the second integrated module to resume transmitting ethernet frames associated with the flow.

15. The system of claim 10, wherein the integrated ethernet switch is operable to suspend transmission of ethernet frames associated with the flow to the first integrated module responsive to receipt of the second initiate pause frame from the first integrated module.

16. The system of claim 10, wherein the second initiate pause frame includes a duration during which the integrated ethernet switch should suspend transmission of ethernet frames associated with the flow.

17. The system of claim 16, wherein the first integrated module is further operable to transmit a second terminate pause frame identifying a duration of the pause to be zero, wherein receipt of the second terminate pause frame causes the integrated ethernet switch to resume transmitting ethernet frames associated with the flow.

* * * * *